United States Patent [19]

Jensen

[11] Patent Number: 4,865,001

[45] Date of Patent: Sep. 12, 1989

[54] GASEOUS FUEL INJECTOR VALVE

[75] Inventor: Scott P. Jensen, Tacoma, Wash.

[73] Assignee: Energy Conversions, Inc., Tacoma, Wash.

[21] Appl. No.: 276,662

[22] Filed: Nov. 28, 1988

[51] Int. Cl.$^4$ .............................................. F02M 21/02
[52] U.S. Cl. ............................... 123/525; 123/27 GE; 123/575
[58] Field of Search .................... 123/525, 27 GE, 575

[56] References Cited

U.S. PATENT DOCUMENTS

| | | | |
|---|---|---|---|
| 1,962,283 | 6/1934 | Nordberg | 123/253 |
| 2,635,589 | 4/1947 | Klinger | 123/27 GE |
| 2,799,255 | 7/1957 | Gehres | 123/27 GE |
| 2,802,460 | 8/1957 | Shirley | 123/27 GE |
| 4,091,772 | 5/1978 | Heater et al. | 123/27 GE |
| 4,463,734 | 8/1984 | Akeroyd | 123/525 |
| 4,531,497 | 7/1985 | Smith | 123/525 |
| 4,612,881 | 9/1986 | Tsjumura et al. | 123/27 GE |
| 4,619,240 | 10/1986 | Bedford et al. | 123/575 |
| 4,637,353 | 1/1987 | Codrington | 123/27 GE |
| 4,742,801 | 5/1988 | Kelgard | 123/27 GE |

Primary Examiner—E. Rollins Cross
Attorney, Agent, or Firm—Leo Gregory

[57] ABSTRACT

A gaseous fuel injector valve for diesel engines having access to the combustion chamber of a cylinder to supplement diesel fuel with natural gas, the valve being adapted to supply gaseous fuel by a programmed electronic control circuit which regulates the valve operation to be in accord with certain sensed engine operation parameters and in timed sequence with the crankshaft position for the optimum time to introduce gaseous fuel.

11 Claims, 3 Drawing Sheets

GASEOUS FUEL INJECTOR VALVE

BACKGROUND OF THE INVENTION

1. Field of Invention

This invention relates to a mixture of a gaseous with a liquid fuel in the operation of an internal combustion engine.

2. Brief Description of the Previous Art

The use of a liquid and a gaseous fuel such as a diesel fuel and natural gas is practiced for the purpose of economy and for a more efficient and cleaner operation of an engine.

A particular problem is present in the application of the mixture of diesel and gaseous fuel to the operation of a two-cycle engine in not having an independent operation of the application of gaseous fuel. The problem is the escape of gaseous fuel with the discharge of scavenging air.

Also improvement is required in the timing of a cycle of introducing a gaseous fuel with regard to certain operating parameters and the operating cycle of an engine to effect improvement in avoiding the escape of gaseous fuel.

Further, there appears to be a problem in prior art practice in avoiding a build-up of carbon deposits, lubricating oil and heat and pressure in a gaseous fuel inlet valve which does not have an independent operation.

SUMMARY OF THE INVENTION

The primary object herein is the operation of an internal combustion engine with the mixture of a gaseous and a liquid fuel in which there is a direct gaseous fuel injection into the combustion chamber of a cylinder controlled by an electronic triggered pneumatic operation in which the valve timing is very nicely arranged to ensure that no gaseous fuel escapes with scavenging air through open exhaust valves.

It is another object to arrange the timing for introducing a gaseous fuel in a manner to eliminate carbon and oil build-up in the gaseous fuel injection or inlet valve when the engine is running in a single fuel mode.

It is also an object herein to control the addition of a gaseous fuel to a liquid fuel independently of the otherwise operation of an engine.

It is another object of the invention herein to effect a conversion of a two-cycle internal combustion engine from a liquid fuel to a dual fuel operation with fewer hardware changes than would otherwise be required.

It is a further object of the invention herein to provide a programmed control to introduce a gaseous fuel for mixture with a liquid fuel at an optimum time resulting from said control sensing certain predetermined parameters of an engine operation and the crankshaft position to avoid the addition of the gaseous fuel during the time when scavenging air is being discharged.

These and other objects and advantages of the invention will be set forth in the following description made in connection with the accompanying drawings in which like reference characters refer to similar parts throughout the several views.

DESCRIPTION OF A PREFERRED EMBODIMENT

Figure 1:
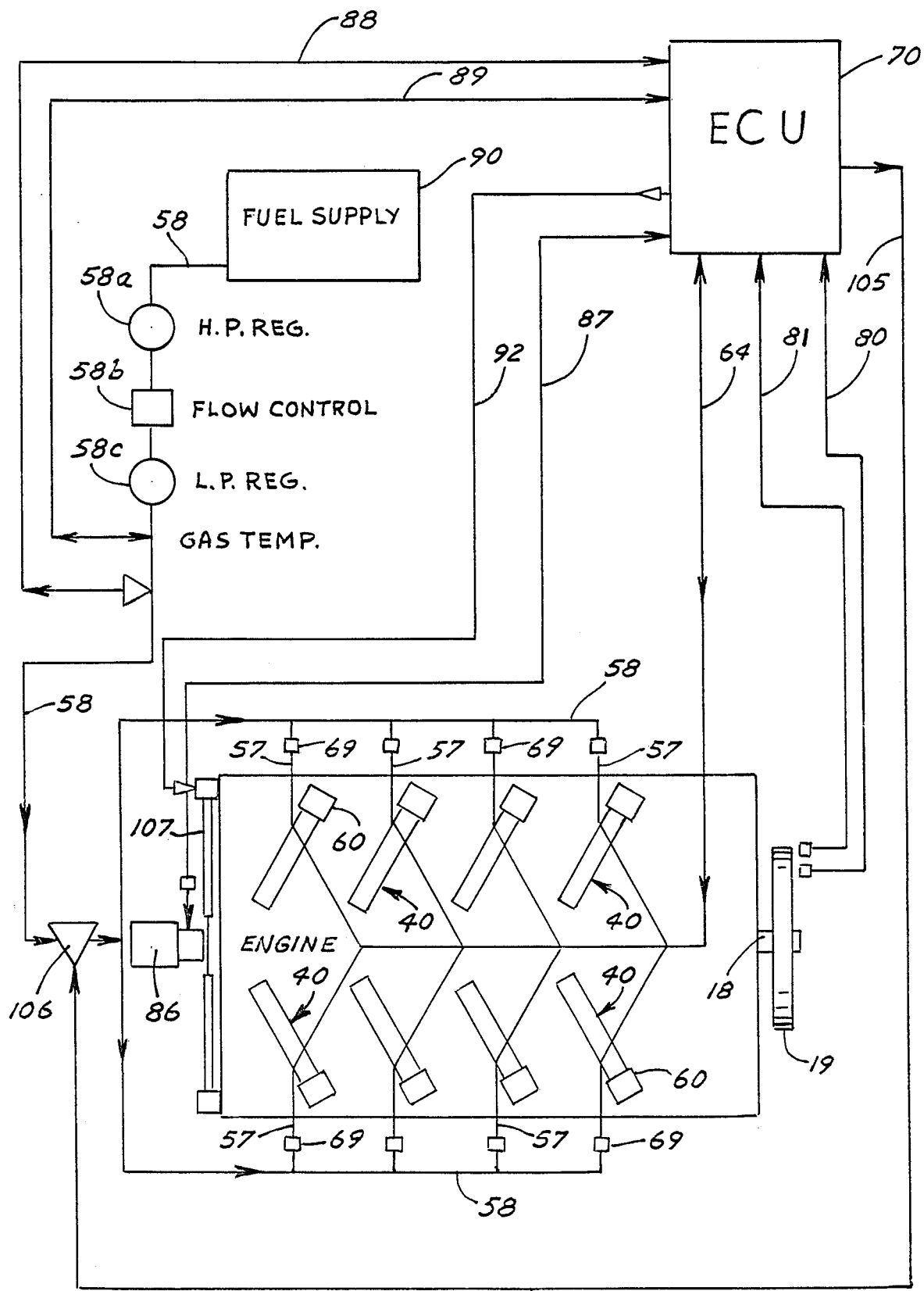
FIG. 1 is a schematic view of a dual fuel arrangement.
Figure 2:
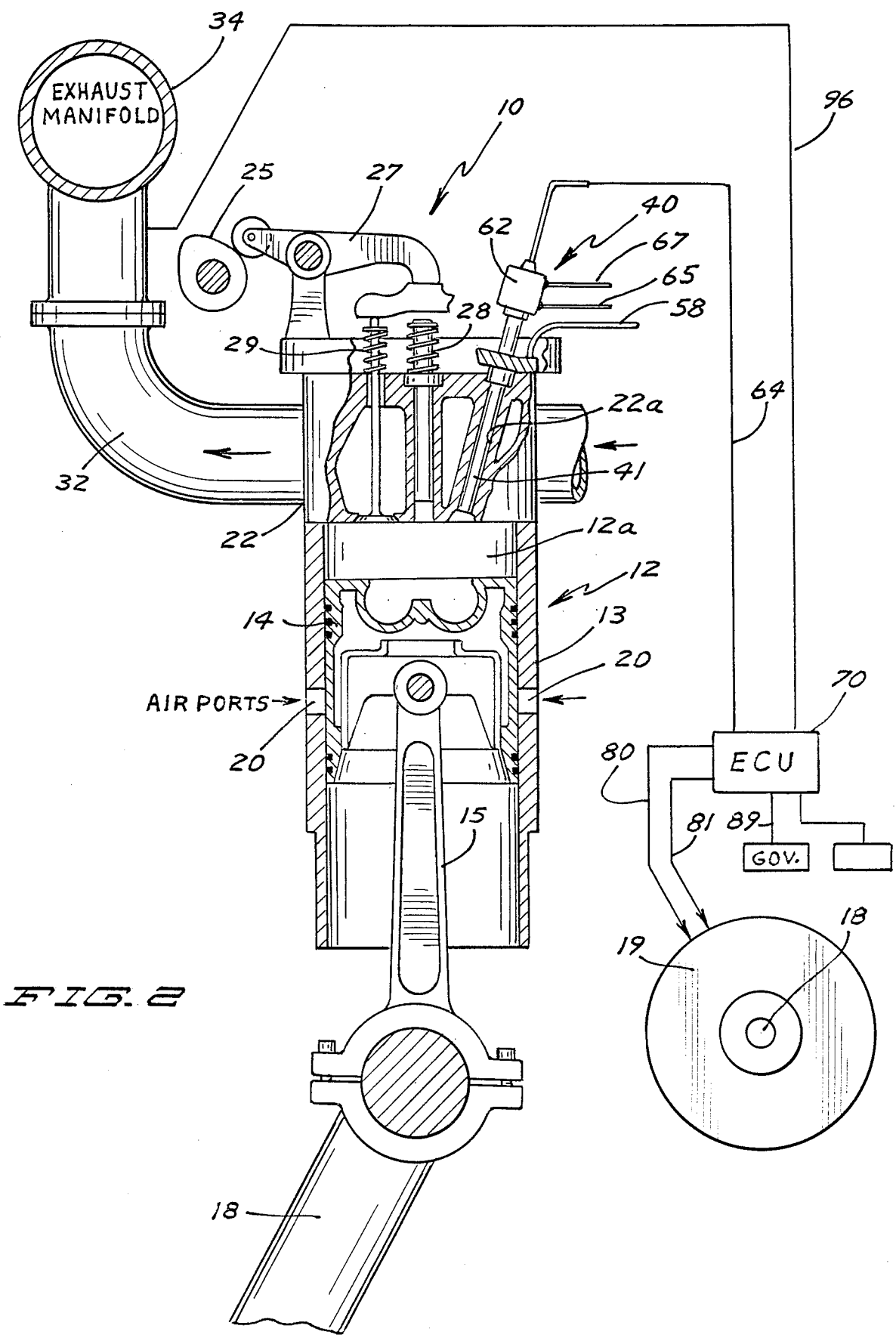
FIG. 2 is a view of a cylinder for the most part in vertical section and some related parts being shown schematically.

The invention herein comprising a gaseous fuel inlet valve in connection with a diesel fueled engine is constructed and arranged to introduce gaseous fuel directly into the combustion chamber of a diesel cylinder. The valve structure is particularly designed to convert a diesel engine to operate either in a diesel fuel mode or in a dual fuel mode with a gaseous fuel with fewer hardware changes than otherwise being required to make the conversion. Diesel fuel as used herein is intended to represent all appropriate liquid fuels and the words diesel and liquid are used to mean the same.

With reference to the drawings, the structure indicated by the reference numeral 10, illustrates a cylinder structure 12 having installed therein a valve 40 which comprises the invention herein and is representative of the other cylinders.

The cylinder structure 12 will first be described. This is a conventional cylinder for a diesel fueled engine and consists of a cylinder block 13 having therein a piston 14 operating a connecting rod 15 which in turn is connected with a crankshaft 18. Air ports 20 are indicated in the cylinder block. A fly wheel is indicated at 19.

Mounted on top of said cylinder is a cylinder head 22. With regard to the intake of a liquid fuel, such as diesel, said cylinder head is fitted with the conventional structure of a cam 25 which operates the rocker arm 27 and which in turn operates the fuel injector valve 28 and an exhaust valve 29. Said exhaust valve discharges through an exhaust passage 32 which in turn exhausts through an exhaust manifold 34.

Said cylinder block has therein a combustion chamber 12a.

An inlet or injector valve 40 comprising the inventive structure is mounted on the head of each cylinder, as the one here described, in connection with a two-cycle engine. A later reference will be made to a four-cycle engine.

The cylinder head is modified to provide a passage 22a which opens into the combustion chamber 12a and the valve housing or body 41 of said valve 40 will be disposed into said passage in communication with said combustion chamber and will be suitably secured therein.

Figure 3:
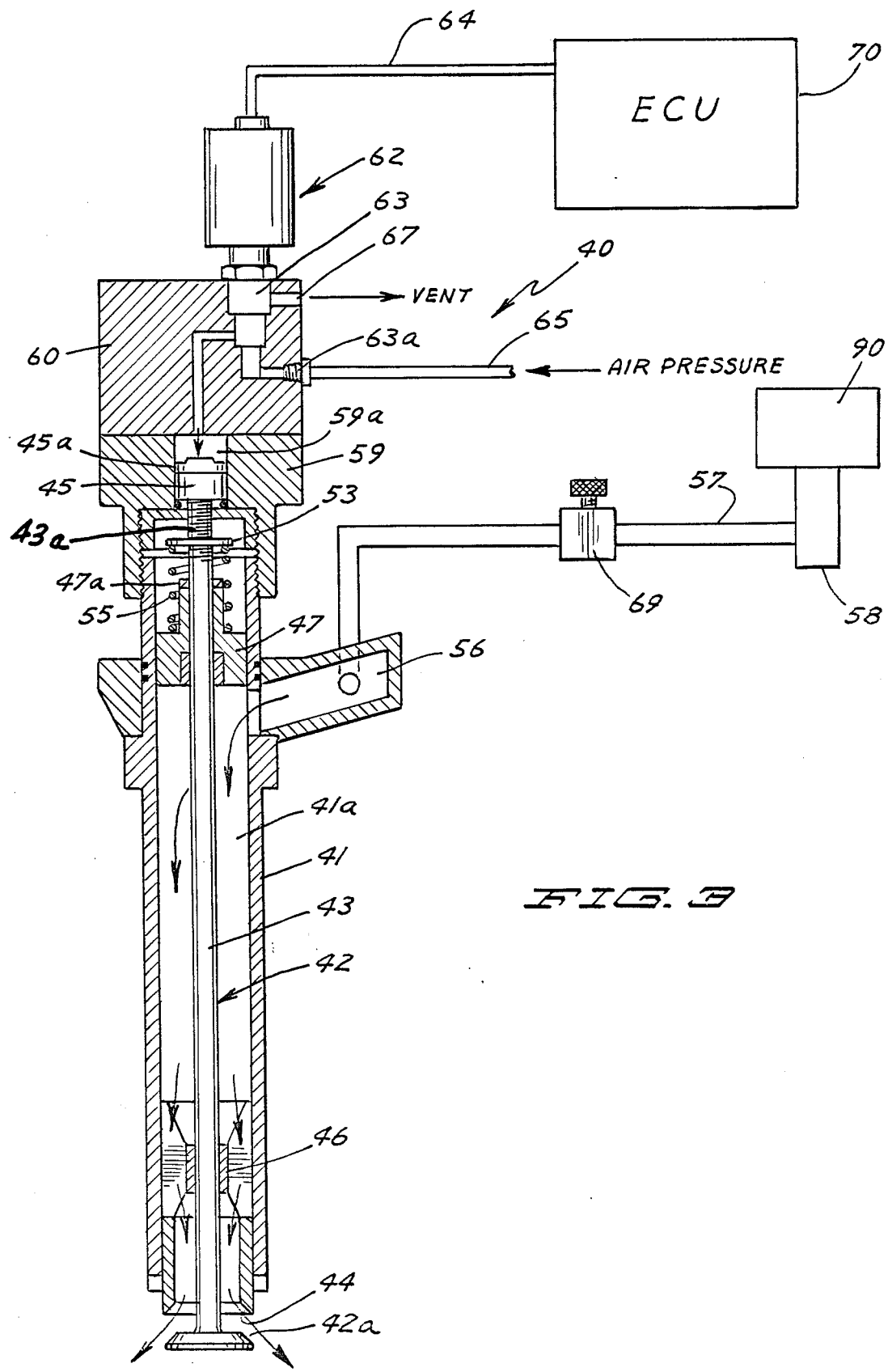
FIG. 3 is a view of a valve structure in vertical section showing some additional related parts.

Referring particularly to FIG. 3, said valve body 41, as illustrated, is elongated and substantially tubular in form having therein a passage 41a which opens into said combustion chamber 12a and disposed therein to open or close said passage is a poppet valve 42 having a stem 43, having an upper threaded portion 43a and having threaded thereon a piston 45, said piston being nicely adjustable on said threaded portion of said stem. In connection with said piston is a piston ring 45a.

The bottom of said valve housing forms a seat or seal 44 for the face portion 42a at the lower end of said valve stem.

Spaced axially within said valve housing are valve stem guides 46 and 47. The lower guide 46 is fluted to permit gas to flow by.

Threaded onto the upper portion of said valve stem is a disc-like adjustable spring retainer 53 permitting a fine adjustment of spring pressure to have all valves with appropriate pre-load pressure. Mounted onto said valve stem between the upper valve guide 47 forming its seat and said retainer 53 is a coil compression spring 55 which normally urges said valve stem 43 upwardly into a closed position to seal the passage 41a.

Secured to said upper valve guide 47 to prevent any gaseous fuel from leaking by is a valve stem seal 47a.

Entering said valve body 41 just below the upper valve guide 47 is a gaseous fuel inlet 56 which will be supplied by means of line 57 which is connected with a general supply line or manifold 58 which in turn is connected with a suitable gaseous fuel supply indicated at 90. Said gas line 57 embodies a gas flow control or trimming valve 69 for control of gas flow which allows an engine load to be balanced cylinder by cylinder.

Mounted onto the upper end portion of said valve body 41 as by being threaded thereon is a cylinder 59 having said piston 45 working therein within a compression chamber 59a. Mounted onto said valve cylinder 59 is a cylinder cap 60.

Suitably mounted in said valve cap 60 is a solenoid valve 62 with a body portion 63 having an air port 63a therein controlling an air passage 65 running therethrough and communicating with said compression chamber 59a. Said air passage is under a constant supply of pressurized air from a conventional suitable air source not here shown. The body of said solenoid forms an air control valve. Said body portion of said solenoid has an air vent 67 therefrom venting to the atmosphere to be fully depressurized when at rest.

Said solenoid valve is electronically connected by line 64 with a programmed electronic control unit 70.

One of the salient features herein is the avoidance of losing gaseous fuel during the time that scavenging air is being discharged. This is accomplished by timing the action of the injector valve 40 to the position of the crankshaft relative to the combustion and exhaust cycles of the cylinder 12.

The operation of said valve 40 is controlled and timed by the programmed electronic control unit 70 sometimes referred to hereafter as ECU. The addition of a gaseous fuel in the operation of said valve 40 is fully independent of the otherwise operation of the engine with diesel fuel. This independent operation avoids a build-up in said valve 40 of various deposits and pressures while the engine is operating in a single diesel fuel mode. The operator of the vehicle decides when to have a mixture of fuels. The control of the admission of liquid fuel is not here shown or described but such a control is well described in U.S. Pat. No. 4,619,240 to T. Y. Bedford, particularly in col. 10, lines 19 through 49 and is indicated by sensor 92 in FIG. 1.

The electronic control unit 70 is programmed to sense various engine parameters, to be described, before energizing the solenoid valve 62 at a pre-programmed optimum time to start the input of gaseous fuel. An important parameter is the position of the crankshaft 18 indicated by sensor 81 to advise the electronic control unit for the passage of gaseous fuel through said valve, that the intake valve is open and the exhaust valve is closed.

Particular reference is now had to the schematic of FIG. 1. In connection with the conversion of a single fuel mode to a dual fuel mode are controls as shown in the schematic.

The general gaseous fuel supply line 58 has included therein a high pressure regulator 58a, a flow control safety cut off valve 58b and a low pressure regulator valve 58c. These are conventional controls.

Also running from the supply line 58 to said ECU 70 is a gaseous fuel flow sensor line 88 and a gaseous fuel temperature sensor line 89. Said ECU controls the cut back of liquid fuel through the control line 92 and to this previous reference has been made. Said ECU controls the gaseous fuel supply line 105 which runs to a flow control valve 106. The engine load is sensed by the sensor 87 running to the governor 86.

The speed of the vehicle is sensed by the flywheel sensor 80 adjacent the flywheel 19. The position of the crankshaft is noted by the sensor 81 scanning conventional position targets or magnets, not shown, on the flywheel. When the crankshaft position indicates that the exhaust valve is just closed, said ECU, with the parameter sensed being in appropriate condition, energizes the solenoid 62 of each cylinder and the injector valves of each cylinder come into operation.

Thus it is seen that said ECU has the exercise of control over lines 92 and 105 and of the operation of the injector valves 40.

From the general gaseous fuel supply line 58 which embodies the flow control valve 106, fuel is supplied to individual cylinders by means of lines 57. Liquid fuel is merely indicated at 107 (FIG. 1) and the passage thereof to the individual cylinders is controlled by means of line 92. The details of this control are not germane to the invention herein.

It is to be understood that specific programmed instructions are established for each engine as to the optimum conditions for use of a dual or mixed fuel and upon such conditions being sensed, the solenoid 62 is energized.

Said solenoid 62 upon being energized opens its port 63a to have pressurized air flow into the compression chamber 59a and said air bears upon the piston 45 forcing it downward to compress the spring 55 and open the passage 41a. Gaseous fuel is then free to flow through said passage 41a into the combustion chamber 12a.

Thus it is seen that injection valve 62 is electrically triggered to cause the valve to be pneumatically actuated.

The gaseous fuel ignites in the combustion chamber 12a with the combustion of the liquid fuel, said gaseous fuel becoming ignited by the pilot fuel injected after the completion of the admission of gaseous fuel. The gaseous fuel is admitted during that part of the compression stroke in said combustion chamber after the exhaust valve is closed and prior to the rapid increase in the compression pressure which follows.

The scavenging air is exhausted in a cycle following the combustion process and prior to the next cycle of entry of gaseous fuel into said combustion chamber. Thus there is no escape of gaseous fuel with the exhaust of scavenging air.

With the entry of gaseous fuel into the combustion chamber, said ECU causes the solenoid valve of each cylinder to close the air supply port 63a and open the air vent 67 to exhaust the compression chamber 59a allowing the spring 55 to close the valve 40 and stop the gaseous fuel flow. A full cycle has been completed.

Said ECU can be very closely controlled to fit a wide range of applications in being able to be optimized for different RPM levels of various engines. The position of the piston 45 and the tension of the spring 55 may be precisely adjusted individually for optimum performance.

The inlet valve structure herein has been described in connection with a two-cycle engine. The valve structure may also be used in connection with a four-cycle engine. Said inlet valve structure on the basis of one valve per cylinder is inserted into the intake manifold of each cylinder and in this situation the gaseous fuel is introduced after an exhaust valve is closed and during the time that an intake valve is open.

It will of course be understood that various changes may be made in form, details, arrangement and proportions of the product without departing from the scope of the invention which, generally stated, consists in a product capable of carrying out the objects above set forth, in the parts and combination of parts disclosed and defined in the appended claims.

What is claimed is:

1. In combination with a cylinder of an internal combustion engine having a liquid fuel inlet valve, an exhaust valve and a combustion chamber,
    a gaseous fuel inlet valve,
    a passage through said gaseous fuel inlet valve into said combustion chamber,
    a gaseous fuel line running to said passage,
    means in said passage normally closing the same,
    a programmed electronic sensing unit sensing the position of the crankshaft of said engine during the time of that part of a compression stroke in said cylinder after said exhaust valve therein is closed and prior to a rapid increase in compression therein, and
    means energized by said electronic sensing unit, upon said electronic sensing means sensing the closing of said exhaust valve, causing said means in said passage to open said passage into said combustion chamber to admit gaseous fuel therein.

2. In combination with a cylinder of an internal combustion engine having a liquid fuel inlet valve, an exhaust valve, and a combustion chamber therein,
    a gaseous fuel inlet valve structure having a passage therethrough communicating with said combustion chamber of said cylinder, and embodying a cylinder having a compression chamber therein,
    a poppet valve disposed in the passage of said gaseous fuel inlet valve and having a piston disposed in said compression chamber,
    a gaseous fuel inlet into the passage of said gaseous fuel inlet valve in connection with a fuel line from a gaseous fuel supply,
    means normally urging said poppet valve to close said passage,
    an air inlet communicating with said compression chamber running to a pressurized air supply,
    an electric valve means controlling the passage of pressurized air from said air inlet into said compression chamber,
    a programmed electronic control means in circuit with said electric valve means,
    means in circuit with said electronic control means sensing the position of the crankshaft of said engine during that part of a compression stroke of said cylinder of said engine when the exhaust valve is closed and the intake valve is open,
    whereby said last mentioned means upon sensing said crankshaft position causes said electronic control means to actuate said valve means to pass pressurized air into said compression chamber to urge said poppet valve to open said passage of said gaseous inlet valve to pass gaseous fuel into said combustion chamber after the exhaust valve is closed and prior to the point of rapid increase of compression pressure therein.

3. The structure of claim 2, wherein
    said electric valve means comprises a solenoid.

4. The structure of claim 2, wherein
    said first mentioned means comprises a compression coil spring.

5. The structure of claim 2, wherein
    said gaseous fuel inlet has a gaseous fuel line running thereto from a fuel supply, and a flow control valve in said gaseous fuel line.

6. The structure of claim 2, including
    an air vent in connection with said compression chamber.

7. The structure of claim 2, wherein
    said gaseous fuel inlet valve having access to said combustion chamber completely independent of the operation of said liquid fuel inlet valve.

8. The structure of claim 2, including
    sensors in circuit with said electronic control means in addition to said sensing means from said crankshaft run from the flywheel of said engine to indicate flywheel speed and from said gaseous fuel line to indicate the gaseous flow rate.

9. The structure of claim 1, wherein
    said inlet valve embodies a compression valve isolated from said passage,
    an inlet of pressurized air into said compression chamber,
    an exhaust outlet from said compression chamber, and
    said second mentioned means alternately opening and closing said air inlet and said exhaust outlet.

10. The structure of claim 1, wherein
    said second means comprises a solenoid,
    said gaseous fuel inlet valve has a compression chamber,
    an air inlet for a pressurized source of air into said compression chamber,
    an exhaust valve from said compression chamber, and
    a body portion of said solenoid forming a controlled air passage alternately admitting pressurized air to enter from said air inlet and exhausting the air therein through said exhaust valve.

11. In combination with a cylinder of an internal combustion engine having a combustion chamber,
    a gaseous fuel inlet valve structure communicating with said combustion chamber,
    electronic means triggering said inlet valve structure, and
    pneumatic means actuating the operation of said inlet valve structure.

* * * * *